Patented Sept. 30, 1952

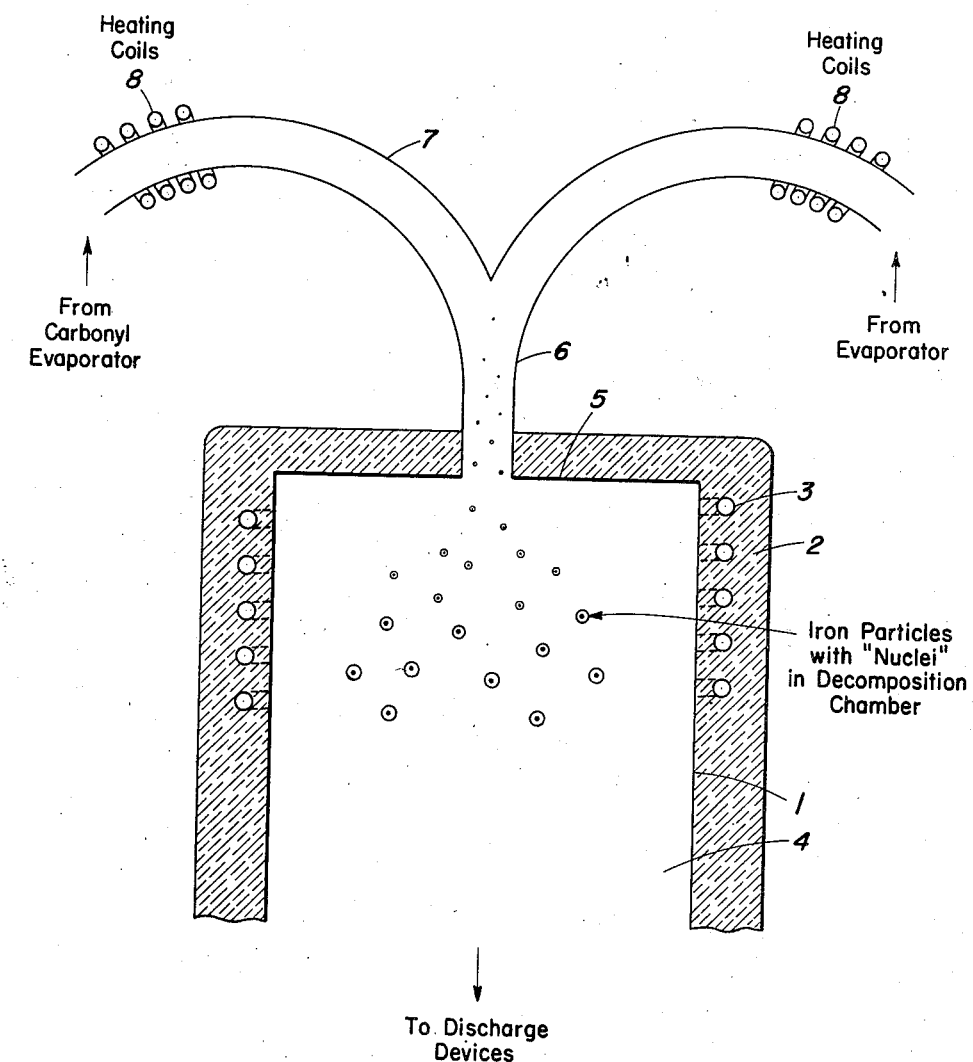

2,612,440

UNITED STATES PATENT OFFICE 2,612,440

PRODUCTION OF METAL CARBONYL POWDERS OF SMALL SIZE

George O. Altmann, Elizabeth, N. J., assignor to General Aniline & Film Corporation, New York, N. Y., a corporation of Delaware Application May 3, 1950, Serial No. 159,722

6 Claims. (Cl. 75—0.5)

The present invention relates to the production of metal powders of particularly small size by the thermal decomposition of metal carbonyls.

The decomposition of a metal carbonyl such as the carbonyl of iron or nickel or mixtures thereof is described, for example, in USP 1,759,659 and USP 1,759,661 and is usually effected by introducing the carbonyl in its vaporized form into a heated vessel in such a manner that the decomposition takes place substantially in the free space of the vessel instead of by contact with the heated walls of the vessel. The metal carbonyl decomposes with the formation of carbon monoxide gas and finely divided metal which is conducted out of the decomposer space by the gas stream and is separated by mechanical, magnetic, or other means.

Metal powders, such as those of iron, nickel and cobalt, produced in this manner, have a wide particle size distribution of say from 2 to 20 microns, and contain usually chemically combined carbon and oxygen, the amount of which is dependent primarily upon the temperature at which the decomposition of the carbonyl is carried out. For example, at a decomposition temperature of from 250° to 300° C., the carbon content of the iron powder produced may amount to .9% to 1.2% and above.

One of the most promising applications of finely divided metal powders lies in the electronic field as magnetic materials. Recent developments in the use of such magnetic materials have shown that besides a suitable carbon content, the size of the individual metal particles as well as the particle size distribution of a mixture of such particles are of the greatest importance for the performance in electric devices, particularly in the high frequency and ultra-high frequency field. For applications in the range of say 10 to 50 megacycles and above, iron particles having a diameter of 3 to 4 microns or less perform satisfactorily, whereas the performance of particles with an average diameter of 6 to 8 microns is inferior. Particles with even larger diameters are of little utility for high frequency work.

As the metal carbonyl decomposition process has been heretofore operated, it invariably led to mixtures having a large percentage of oversized particles, i. e., particle sizes having a diameter of 12 microns or above. This is not surprising when one considers the mechanism of decomposition. Thus the carbonyl vapor enters the hot zone and becomes heated therein. Those molecules which occupy the more favorable position receive heat faster than others and will accordingly decompose first with the formation of metal nuclei. Once a certain number of nuclei have formed, the vapor will decompose on the nuclei and contribute to their growth in preference to forming new nuclei. This is attributable to the fact that the initially formed nuclei will receive more radiant heat than the carbonyl vapor due to their much higher absorption coefficients, and thus becomes sources of heat for neighboring vapor molecules which will decompose on contact with them.

Considerable effort had been made in the past to separate such mixtures of particles of widely different sizes into suitable fractions to remove the undesirable particles above a certain maximum size. However, no improvements have been devised for the decomposition process itself which would automatically eliminate the formation of oversized particles or result in powders of a definite, desired particle size. As a matter of fact, the art had about concluded that the only way to obtain uniform particles of the desired size was by the fractionation method.

I have now found that the thermal decomposition of metal carbonyls can be effected to yield metal powders with a closely controlled particle size distribution and of a particle size ranging from about 3 to 7 microns in diameter by an artificial increase in the number of particle nuclei per unit quantity of metal carbonyl. This increase may be achieved according to my invention by supplying to a carbonyl reactor a vapor which condenses, upon entering the decomposition stage, into very small liquid particles which act as nuclei upon which the carbonyl vapor thermally decomposes, i. e., centers of further decomposition. In other words, my procedure envisages the thermal decomposition of the metal carbonyl onto nuclie supplied by the condensation of vapors into liquids boiling above the decomposition temperature.

To illustrate, it may be pointed out that under normal conditions, 1 lb. of iron carbonyl vapor decomposes into approximately 500 billion particles weighing a total of approximately 130 grams. Half of this weight, or 65 grams, is made up of particles of diameters larger than 7 microns while the other half is made up of particles having a smaller diameter. By my procedure it is possible to form a larger number of particles, i. e., about 4000 billion from 1 lb. of iron carbonyl vapor. Again the total weight of the particles will be 130 grams but the average weight of a particle will be only one-eighth of what it had been, and accordingly the average diameter of the particles will be approximately one-half, or 3.5 microns instead of about 7 microns.

The preparation of carbonyl metal powders of extremely small diameter and of uniform size distribution by providing liquid nuclei through the condensation of a vapor supplied to the carbonyl reactor, and upon which nuclei the carbonyl metal builds by thermal decomposition of the metal carbonyl, constitute the purposes and objects of the present invention.

The metal carbonyl which may be of any metal having electromagnetic properties such as iron, cobalt, nickel and molybdenum is effected in the free space of a metal tower having a height of about 16 feet and a diameter of about 3 feet. Such decomposition is effected at a temperature ranging from about 150 to 350° C. and a pressure of from about 1 to 2 atm. Usually the rate of feed of the metal carbonyl for a reactor of the above dimensions is of the order of 1 cu. ft. per minute.

Suitable vapors which condense in the reaction space are vapors of a mixture consisting of about 26.5% of diphenyl and 73.5% of diphenyl oxide and boiling at 260° C., the silicon oils described in U. S. Patents 2,258,218, 2,258,220 and 2,258,222 and hydrocarbons boiling above 250° C., i. e., boiling between 250 and 300° C. and referred to in Table LXXXIV, p. 606, of "Motor Fuels, Their Production and Technology," by Leslie, published in 1923.

The use of such vapors to supply nuclei upon which the carbonyl metal deposits has the further advantage that the latent heat of condensation is used to heat the surrounding metal carbonyl vapor quickly to the temperature of decomposition.

The invention is further illustrated in the accompanying drawing which discloses a diagrammatic section, partly cut away, of a front elevation of an apparatus for carrying out my invention.

Referring to the drawing, the reactor 1 comprises a steel tower of the aforestated dimensions provided with heat insulation 2 and coils 3 for supplying heat to the reactor to raise the reaction zone, indicated by reference numeral 4, to the desired reaction temperature. It is understood that the temperature will vary within the above stated range depending upon the boiling point of the liquid used to provide the centers of decomposition.

The top 5 of reactor 1 has an inlet tube 6 which connects with an evaporator (not shown) for the high boiling liquid, the vapors of which are fed to the reaction zone. Inlet tube 6 is provided with a branch 7 for feeding metal carbonyl into the reactor. Inlets 6 and 7 are both provided with heating coils to insure maintenance of the temperature of the vapors fed therethrough.

The following example, when taken with the drawing, will serve to further explain the invention.

Example

Heating fluid is circulated through coil 3 to raise the temperature of the reaction zone 4 to 200° C. Iron carbonyl is vaporized and fed through inlet 6 at a rate of about 1.8 lb. per minute. Vapors from a liquid mixture of 26.5% of diphenyl and 73.5% of diphenyl oxide and boiling at 260° C. are fed through inlet 6 at a rate of less than $1/100$ of that with which the metal carbonyl is fed to the reactor.

The vapors of the diphenyl and diphenyl oxide upon entering the reaction zone, having a temperature below the boiling point of the mixture, condensers to form finely divided liquid particles upon which the carbonyl iron produced by thermal decomposition deposits.

The carbon monoxide gas and iron particles are continuously withdrawn from the bottom of reactor 1 and separated by means of a conventional separating tank and filter (not shown). The iron powder after a gentle milling exhibits a weight average diameter of 4 to 5 microns.

Various modifications of the invention will occur to persons skilled in the art. Thus instead of decomposing the vapors of a single metal carbonyl, vapors of a mixture of carbonyls may be employed, such as iron and nickel, nickel and cobalt, and the like. Similarly, in lieu of the vapors of a mixture of diphenyl and diphenyl oxide, any of the other liquids referred to herein may be employed. I accordingly do not intend to be limited in the patent granted except as necessitated by the prior art and the appended claims.

I claim:

1. The process of producing carbonyl metals of a very small particle size and uniform size distribution which comprises thermally decomposing a metal carbonyl in the free space of a reactor, feeding into the reactor the vapors of a liquid boiling above the decomposition temperature of said metal carbonyl and causing the metal produced by such decomposition to deposit on liquid nuclei produced within said free space by the condensation of the vapors of said liquid.

2. The process as defined in claim 1 wherein the vapors are produced from a mixture consisting of about 26.5% of diphenyl and 73.5% of diphenyl oxide and boiling at 260° C.

3. The process as defined in claim 1 wherein the metal carbonyl is iron carbonyl.

4. The process as defined in claim 1 wherein the metal carbonyl is decomposed at a temperature ranging from 150 to 350° C.

5. The process of producing carbonyl iron of a very small particle size and uniform size distribution which comprises feeding iron carbonyl into the free space of a reactor maintained at a temperature ranging from 150 to 350° C., simultaneously feeding into the reactor the vapors of a liquid boiling above the temperature at which said reactor is maintained, effecting thermal decomposition of the iron carbonyl while causing the iron produced by such decomposition to deposit on liquid nuclei produced within said free space by the condensation of the vapors of said liquid.

6. The process as defined in claim 5 wherein said liquid is fed into the reactor at a rate of less than $1/100$ of that at which the iron carbonyl is fed to the reactor.

GEORGE O. ALTMANN.

REFERENCES CITED

The following references are of record in the file of this patent:

UNITED STATES PATENTS

| Number | Name | Date |
|---|---|---|
| 1,759,660 | Mittasch et al. | May 20, 1930 |